J. W. THOMAS.
TRACTOR.
APPLICATION FILED MAR. 28, 1917.

1,286,146.

Patented Nov. 26, 1918.
2 SHEETS—SHEET 2.

WITNESSES

INVENTOR
James W. Thomas
BY
ATTORNEY

UNITED STATES PATENT OFFICE.

JAMES W. THOMAS, OF CORYDON, INDIANA.

TRACTOR.

1,286,146.  Specification of Letters Patent.  Patented Nov. 26, 1918.

Application filed March 28, 1917. Serial No. 158,000.

*To all whom it may concern:*

Be it known that I, JAMES W. THOMAS, a citizen of the United States, residing at Corydon, in the county of Harrison and State of Indiana, have invented certain new and useful Improvements in Tractors, of which the following is a specification.

This invention relates to tractors, and particularly to tractors for drawing agricultural machinery, such as grain binders, mowers, plows, cultivators, and the like, and may also be used as motive power for other machinery and for use as a truck. Generally considered, the tractor comprises a frame carrying a motor for driving an axle, upon which ground wheels may be mounted and which is also adapted to receive sprocket wheels, gear wheels or belt wheels for the purpose of conveying power to machines of various kinds. A tractor is also provided with front steering wheels, a seat and steering mechanism similar to a conventional motor vehicle, and means at the rear of the frame for attaching the same to the implement or machine to be drawn over the ground.

With the above as the principal objects in view the invention consists in the novel construction, combination, and arrangement of parts hereinafter described, pointed out in the appended claim, and illustrated in the accompanying drawing, in which—

Fig. 4 is a detail view of the lever mechanism for tilting the platform of the grain binder to raise and lower the cutter bar.

Figure 1:
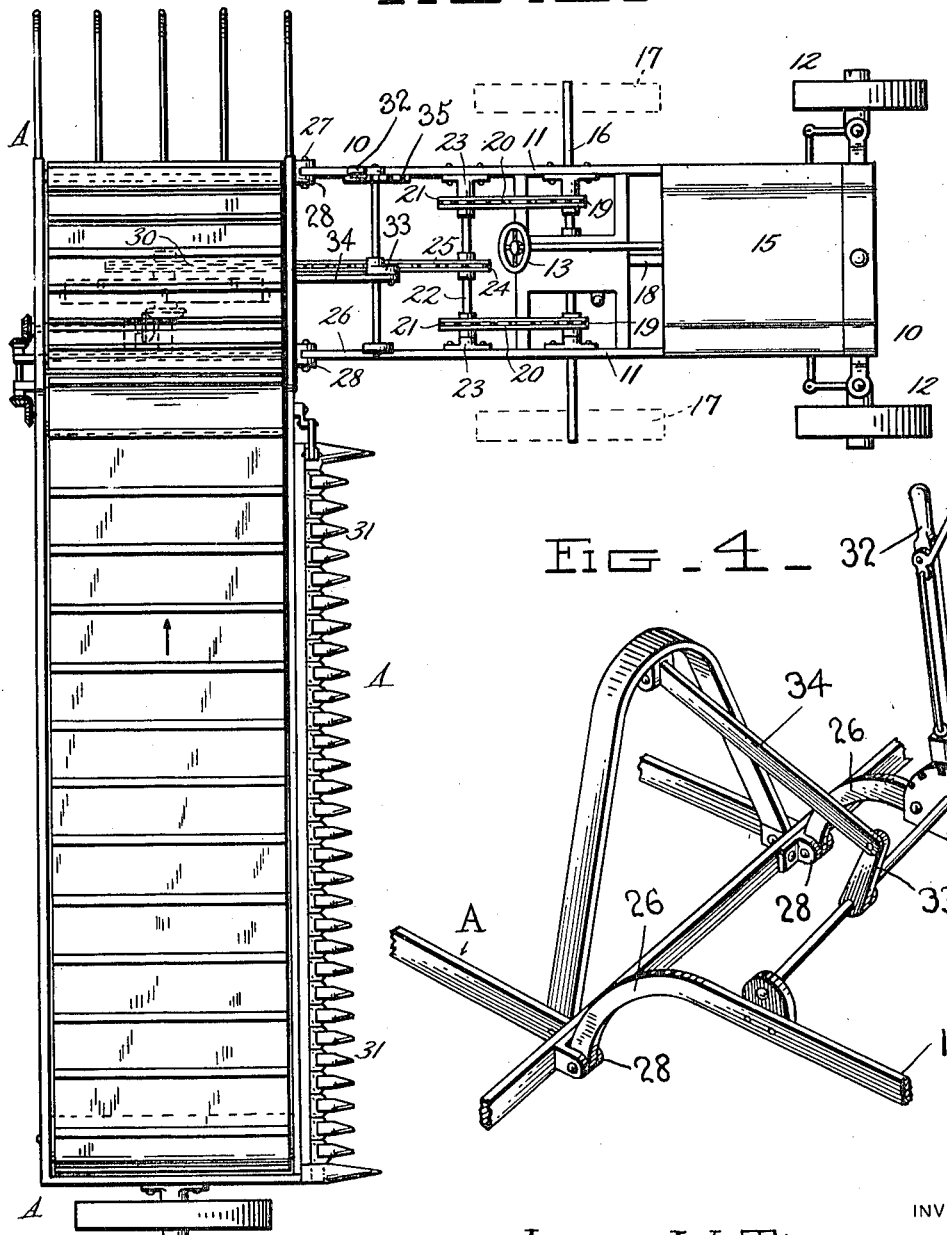
Figure 1 is a plan view of the tractor connected to a grain binding machine.

In the drawings, 10 indicates the frame of the tractor comprising two parallel side bars 11 mounted at their front ends on a pair of steering wheels 12 controlled in the manner common to automobiles by a steering wheel 13 adjacent the driver's seat 14. Upon the front of the frame is the usual motor inclosed within a hood 15 and near the rear of the frame is a horizontal driving axle 16, upon the ends of which may be mounted ground wheels 17, shown in dotted lines in Fig. 1, when the tractor is to be used as a truck. The main shaft 18 of the motor is connected by gearing, not shown, in the usual manner with the rear axle, and fixed to said axle in one form of the device are two sprocket wheels 19 connected by chains 20 with sprocket wheels 21 on a cross shaft 22 rotating in bearings 23 fixed to the inner sides of the side frames 11. The shaft 22 also carries a sprocket wheel 24 that drives a chain 25 extending rearwardly to the grain binder A.

Figure 2:
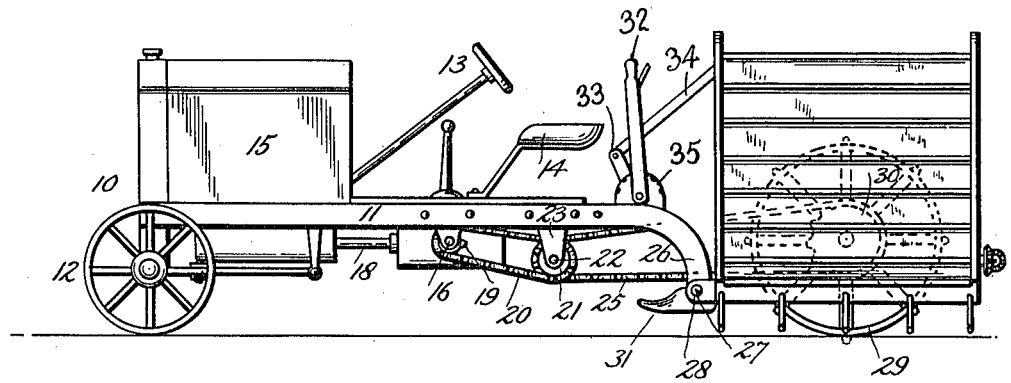
Fig. 2 is a side elevation of the same as seen from the stubble side.

The rear ends of the side bars 11 may be turned downwardly, as at 26, Fig. 2, or continued in a straight line and are provided at their terminal ends with perforations to receive bolts 27 by means of which these bars are pivotally connected to bearing brackets 28 secured on the front of the frame of the binder. On the shaft of the driving or bull wheel 29 of the binder is keyed a sprocket wheel 30, about which the chain 24 passes and which rotates said wheel to cause the forward movement of the binder, and, through the usual gearing, drive the binding mechanism, the cutter bar, the platform conveyer, and the grain reel.

For the purpose of tilting the binder platform to vary the height of the cutter bar 31 from the ground there is pivoted on the frame 10 of the tractor an upwardly extended hand lever 32 on the shaft of which lever is fastened a shorter arm 33 pivotally connected at its free end by a link 34 with the top of the binder frame where it arches over the bull wheel 29. A toothed plate 35 is bolted to the tractor frame 10, and by means of the usual locking mechanism on the lever 32, the arm 33, consequently the position of the binder frame and cutter bar may be maintained in any desired position.

Figure 3:
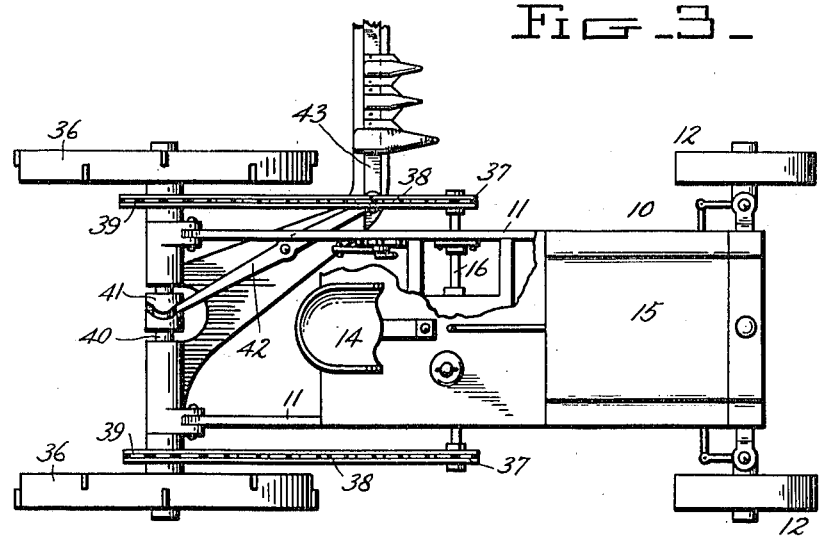
Fig. 3 is a plan view of the tractor attached to a mowing machine.

When used to haul a mowing machine, as shown in Fig. 3, the side bars 11 of the tractor frame are connected to the frame of the mower, and the same driving mechanism shown as employed with the binder may be connected to the shaft of the supporting wheels 36, or if desired, sprocket wheels 37 may be secured to the outer ends of the rear axle 16 and chains 38 extended from each sprocket wheel to sprocket wheels 39 on the mower axle 40, and thus serve to drive said wheels to advance the mower and also rotate a cam 41 on the shaft 40 that actuates the rocking lever 42 connected to the sickle bar 43.

Instead of sprocket wheels 37, gear wheels or belt wheels may be substituted therefor when the tractor is to be employed for driving fixed machinery, and, as previously stated, when using the tractor as a truck, ground wheels 17 are substituted for the sprocket wheels 37.

A vehicle of this type is simple, can be readily operated, and will be found very useful around the farm for heavy traction work of all kinds and for use as power for driving stationary machines, and also as a truck, the changes necessary to convert the tractor to its various uses being few and simple, and can be readily made by any farmer.

What is claimed is:

A tractor comprising a frame including a pair of parallel side bars having downwardly curved rear ends, a front axle mounting steering wheels, and a rear shaft on the ends of which ground wheels may be mounted, a motor supported on said frame and coupled to said shaft for driving the same, horizontal pivot pins connecting the downwardly curved ends of said frame bars to the front of a trailer whereby the weight of the tractor tends to depress the front of the trailer, driving means actuated by the shaft of the tractor adapted to operate the drive wheel of the trailer, a rock shaft mounted on the tractor frame, an operating lever on the end of said rock shaft, locking means for holding the lever in adjusted position, an arm on said rock shaft, and a link connection between said arm and the trailer for rocking the latter and raising or lowering the front thereof when the operating lever is actuated.

In testimony whereof I affix my signature in presence of two witnesses.

JAMES W. THOMAS.

Witnesses:
ARTHUR B. RICHERT,
ROSE KELLER.